Aug. 15, 1950     E. I. EICHER     2,518,606
BALED HAY LOADER
Filed Nov. 5, 1946
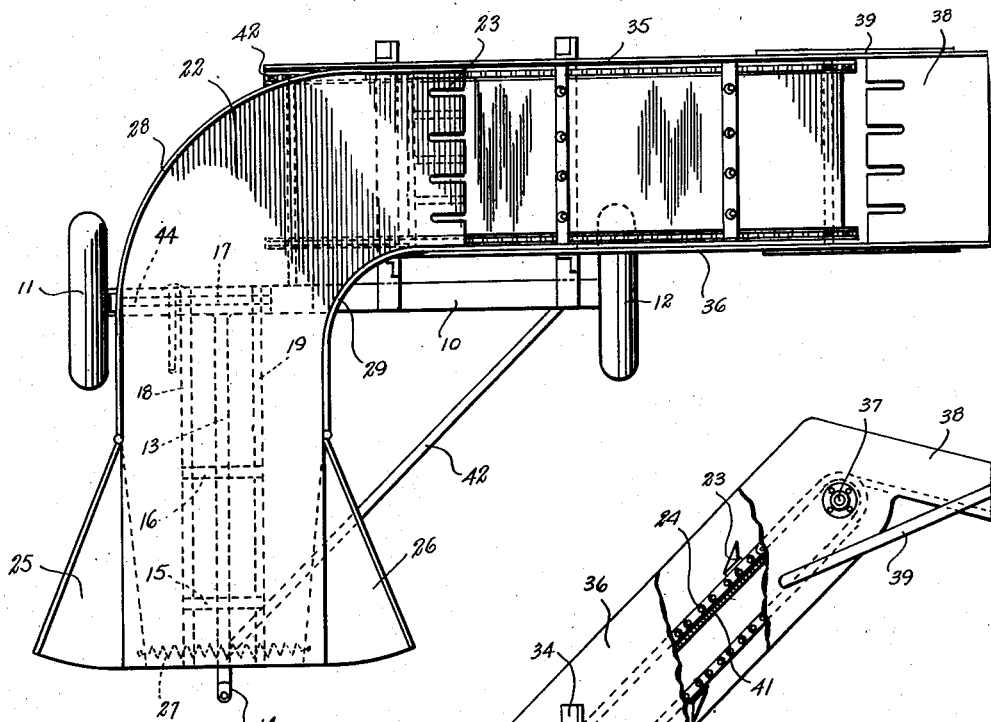
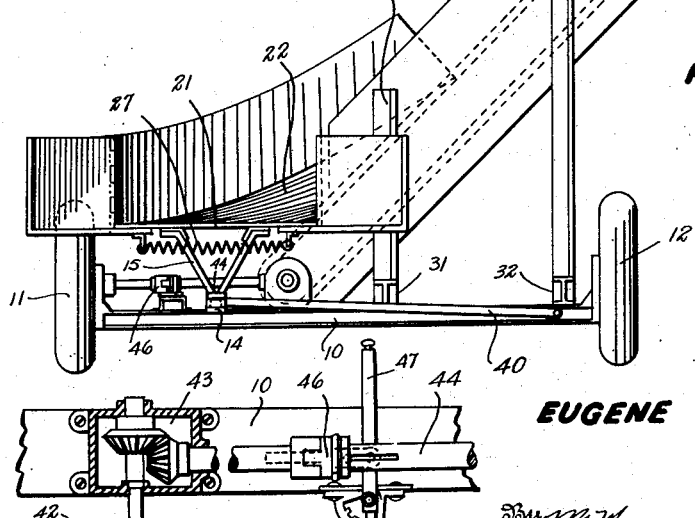
Inventor
EUGENE I. EICHER,
By McMorrow, Berman & Davidson
Attorneys

UNITED STATES PATENT OFFICE 2,518,606

BALED HAY LOADER

Eugene I. Eicher, Peoria, Ill.

Application November 5, 1946, Serial No. 707,926

1 Claim. (Cl. 198—46)

This invention relates to baled hay loaders and more particularly to a type adapted to be connected in a trail-behind manner to the rear of a hay baler.

It is an object of the present invention to provide a baled hay loader which is of simple construction and wherein the hay baled is pushed rearwardly throughout a part of its path along the loader by the extrusion of the bales from the hay baler, the only independent conveying mechanism required is for effecting the elevating of the hay bale once it has been pushed rearwardly on the bale loader by the hay baler and given a right angle turn into position to be drawn upwardly by the conveyor extending at right angles to the part of the loader which first receives the hay bale from the baler machine.

It is another object of the present invention to provide a simple means for effecting the operation of the laterally extending conveyor wherein the same can be driven by one of the supporting wheels and wherein this drive can be easily and readily disengaged at times when the machine is merely being transported.

It is another object of the present invention to provide a simple supporting construction for the forward part of the loader, forwardly of the supporting axle and including a hitch member by means of which the loader is connected to the hay baler in position to receive the hay bales therefrom.

It is another object of the present invention to provide a hay bale loader wherein there is a sliding surface for the hay bale which is inclined upwardly as a right angle turn is made in the path of movement of the hay bale and thereby keeping the overall length of the hay bale loader to a minimum.

For other objects and for a better understanding of the invention, reference may be had to the following detailed description taken in connection with the accompanying drawing, in which:

Figure 1 is a plan view of the hay bale loader embodying the features of the present invention.

Figure 2 is a front elevational view of the hay bale loader shown in Figure 1.

Figure 3 is a fragmentary and detail view of the drive mechanism for operating the laterally extending conveyor and showing the clutching device therefor.

Referring now to the figures, 10 is an axle of eye beam section having supporting wheels 11 and 12 at opposite ends of the same. Connected to this axle 10 is a draw bar or tongue 13 having a forward hitch portion 14 adapted to connect the implement to a hay baler. Extending upwardly from the draw bar 13 at longitudinally spaced locations therealong are two V-shaped brackets 15 and 16 and a third V-shaped bracket 17 extending upwardly from the axle 10. On the top ends of these V-shaped brackets and laterally spaced from one another are longitudinally extending angle members 18 and 19 to which a sheet metal floor 21 is connected. As the hay bale is received from the hay baler it is deposited upon this floor 21 and is pushed rearwardly thereover by a succeeding bale of hay leaving the hay baler. These bales of hay will continue until the first bale is pushed to a rear station on the floor 21 and has started to pass upwardly on a rounded and inclined surface 22 extending rearwardly of the axle 10 and serving to give the hay bale a right angle turn to press it in position to be received by the hook projections 23 of a conveyor 24 extending laterally of the implement so as to raise the hay bale upwardly into position to be put into a hay rack or truck to be transported when the truck has been filled to another and storage location.

At the forward end of the floor 21 and at opposite sides thereof there are disposed outwardly swinging wing members 25 and 26 normally retained in an inwardly swung position by a spring 27 extending between them. By the provision of these wing members the hay bale can more readily be directed along to the floor surface 21 so as to be properly headed toward the rear of the bale loader. Extending upwardly from the sides of the rounded and inclined surface 22 are high side projections 28 and 29. These projections assist in the directing of the hay bale over the surfaces 21 and 22 to thereby cause the same to make a definite right angle turn.

Extending rearwardly from the axle 10 and from the side thereof which extends in the direction of the conveyor 24 are rearwardly extending supporting members 31 and 32 which have connected to them a pair of upstanding vertical supports 33 and 34, respectively. These supports 33 and 34 are of angle formation and upon them sides 35 and 36 are supported in an inclined position. The upper end of the conveyor 24 passes over an idler 37 carried upon the upper ends of the sides 35 and 36 to direct the hay bale into a chute 38 carried on the upper end of the sides and braced by a bracket 39. There is one of these brackets 39 on each side of the structure. The chute 38 directs the hay bale into the truck which is driven alongside the hay bale loader.

Connected between the sides 35 and 36 is a floor 41 on which the bale is supported while it is being carried upwardly by the conveyor 24.

The tongue or draw bar 13 is braced near its forward end by a brace 40 extending between the forward end and the axle 10 at a location near to the wheel 12. The entire structure is so arranged that there will be no difficulty in balancing the structure upon the two wheels 11 and 12.

The lower end of the conveyor 24 passes over a driving sprocket structure 42 connected with a beveled gear arrangement 43 which is driven from a shaft 44 connected with the wheel 11. As the implement is drawn over the ground the conveyor will be driven through the connection of the wheel 11 with the sprocket structure 42. In the shaft connection 44 is a clutch arrangement 46 adapted to be operated by a hand lever 47. At times when there is no necessity for the conveyor 24 to be operated as at times when the implement is being taken to the field, the hand lever 47 will be adjusted over the rack 41 to disengage the members forming a part of the clutch 46.

While various changes may be made in the detail construction it shall be understood that such changes shall be within the spirit and scope of the present invention as defined by the appended claim.

Having thus described the invention, what is claimed is:

A self-contained hay bale loader comprising in the combination of a chute with a chain conveyor, the features which include an axle structure with supporting wheels at the ends thereof, an elongated floor portion connected to and extending forwardly and transversely of the axle structure and having a rounded and upwardly inclined floor portion forming a rearward continuation of the elongated floor portion, the rounded and upwardly inclined floor portion extending past the axle structure and terminating in an upwardly inclined end directed parallel to said axle structure and together with the elongated floor portion constituting the chute, a hitch at the forward end of the elongated floor portion, rearwardly extending supports spaced apart and fixed upon the latter axle structure, upwardly directed supports fixed on the rearwardly extending supports and serving to support the chain conveyor in upwardly inclined position, and a short inclined delivery chute fixed at the upper end of the chain conveyor for delivering bales of hay from the conveyor to a vehicle, the chain conveyor and the short delivery chute connected thereto being substantially parallel in plan to said axle structure, the arrangement being such that the elongated floor portion largely counterbalances the weight of the upwardly inclined and rounded floor portion and the chain conveyor upon said axle structure.

EUGENE I. EICHER.

REFERENCES CITED

The following references are of record in the file of this patent:

UNITED STATES PATENTS

| Number | Name | Date |
|---|---|---|
| Re. 16,448 | Barber | Oct. 26, 1926 |
| Re. 21,132 | Innes | June 27, 1939 |
| 719,158 | Stovin | Jan. 27, 1903 |
| 2,316,435 | James | Apr. 13, 1943 |
| 2,343,133 | Blank | Feb. 29, 1944 |
| 2,390,306 | Hunziker | Dec. 4, 1945 |
| 2,397,570 | Smoker | Apr. 2, 1946 |